United States Patent [19]

Bleakney

[11] 4,223,839
[45] Sep. 23, 1980

[54] CORNER WATERING CIRCLE MOVE

[75] Inventor: Robert W. Bleakney, Eugene, Oreg.

[73] Assignee: Pierce Corporation, Eugene, Oreg.

[21] Appl. No.: 969,350

[22] Filed: Dec. 14, 1978

[51] Int. Cl.³ .......................... A01G 25/09; B05B 3/18
[52] U.S. Cl. ................................ 239/177; 137/614.06;
  239/DIG. 1; 251/149.9; 285/24
[58] Field of Search ............... 239/177, 178, 183, 184,
  239/188, 200, 212, DIG. 1; 137/344, 614.06;
  285/5, 6, 158, 24, 27; 251/149.9

[56] References Cited
U.S. PATENT DOCUMENTS

| | | | |
|---|---|---|---|
| 3,406,907 | 10/1968 | Wallace | 239/177 |
| 3,459,442 | 8/1969 | Yarmett et al. | 285/27 |
| 3,984,052 | 10/1976 | DiPalma | 239/183 |
| 4,036,436 | 7/1977 | Standal | 239/183 |

Primary Examiner—Andres Kashnikow

Attorney, Agent, or Firm—Klarquist, Sparkman, Campbell, Leigh, Hall & Whinston

[57] ABSTRACT

A corner watering circle move in which a line move and sprinklers thereon are stopped when the move comes to a corner portion of a field, an end section of the move then is swung to move a movable coupling member thereon into coupled engagement with a set coupling member, water then is supplied from the line through the coupling members to set sprinklers in the corner portion. After a predetermined sprinkling time, the line is cut off from the coupling sections, the sprinklers on the line are started, the end section is backed away from the set coupling member to a position aligned with the rest of the line and the movable coupling member is offset from the set coupling member, and the line move is moved to the next corner portion. The sprinklers on the line have differential pressure valve actuated by a pilot line on the line to control water supply to these sprinklers.

11 Claims, 10 Drawing Figures

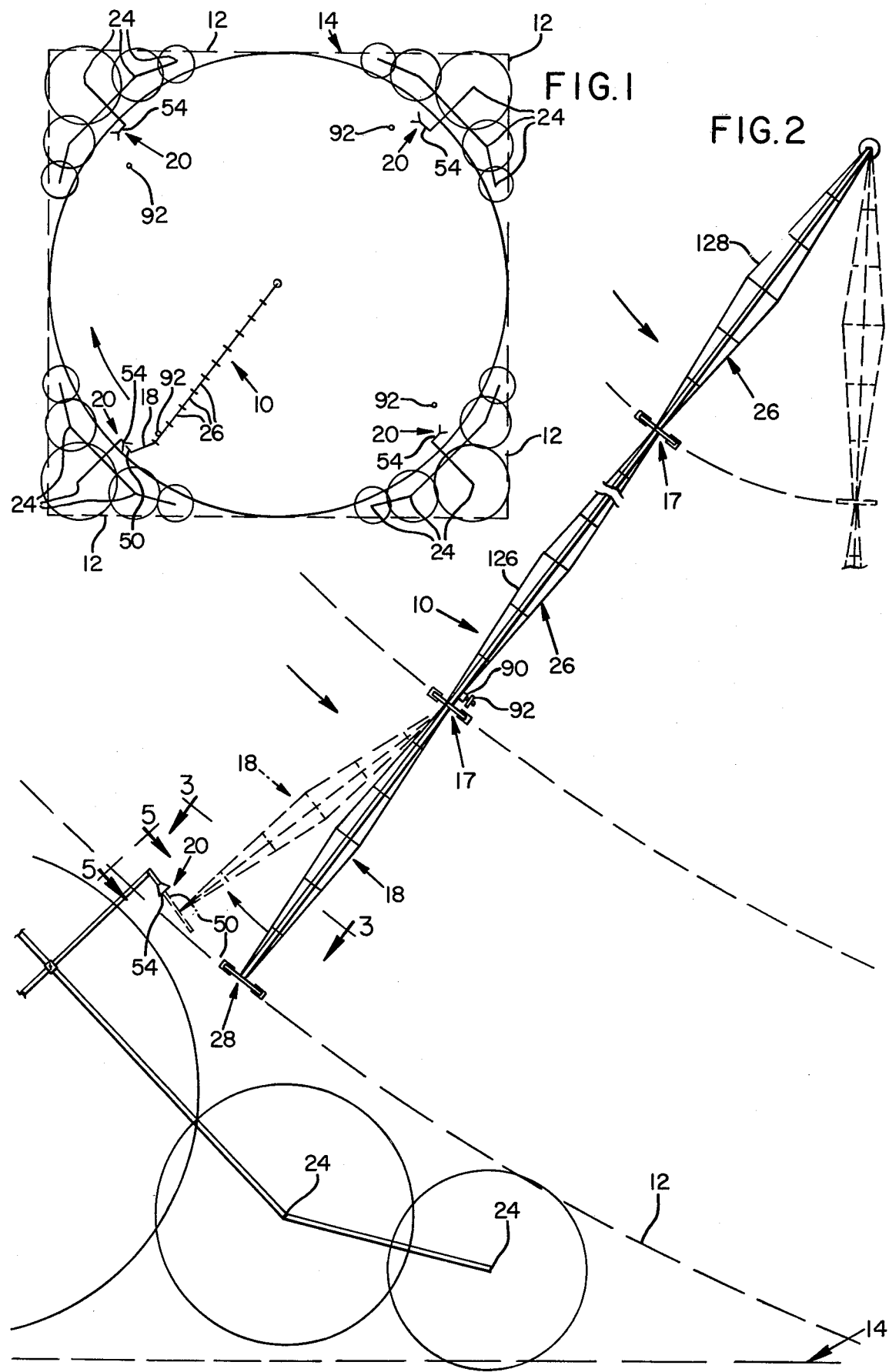

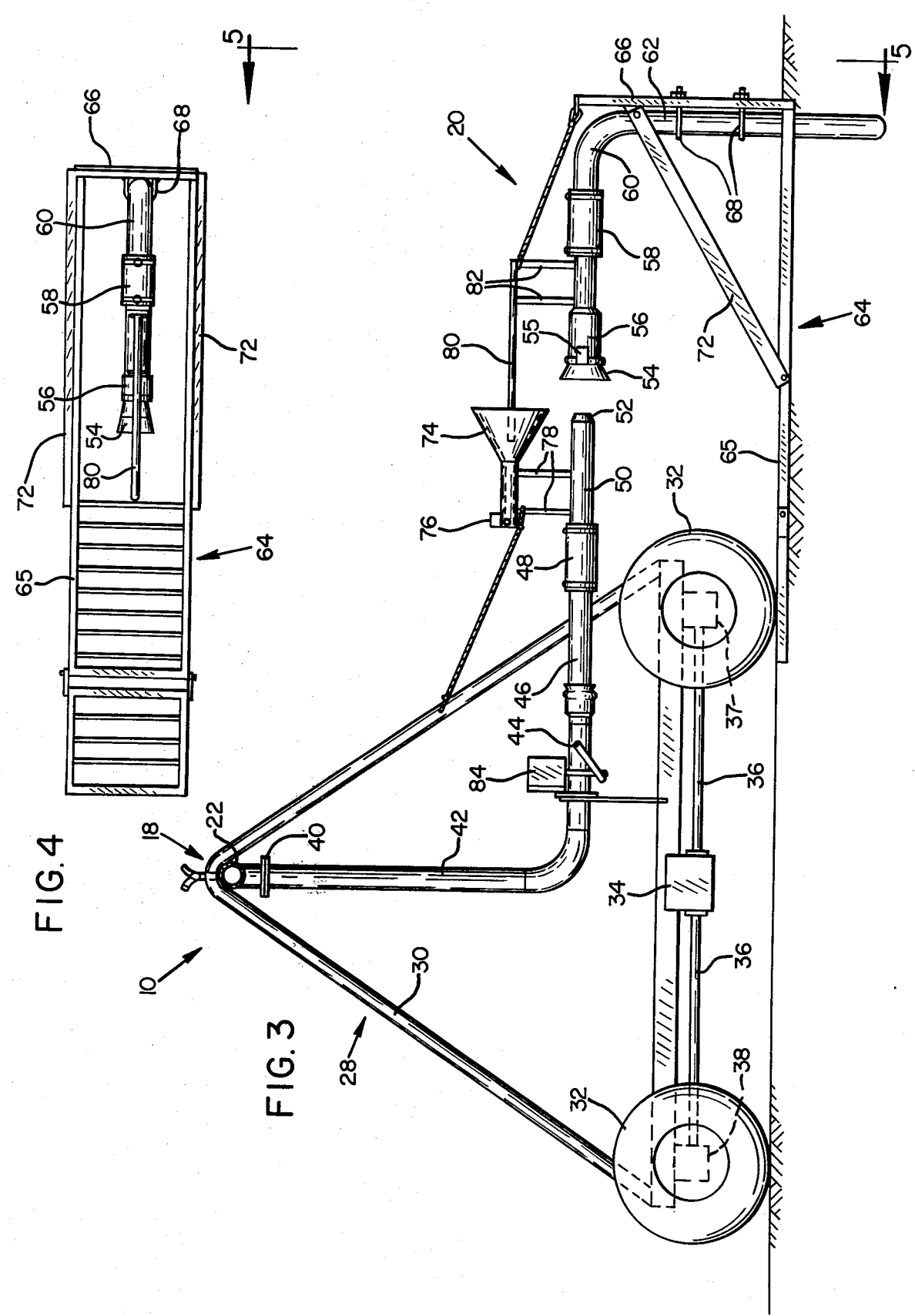

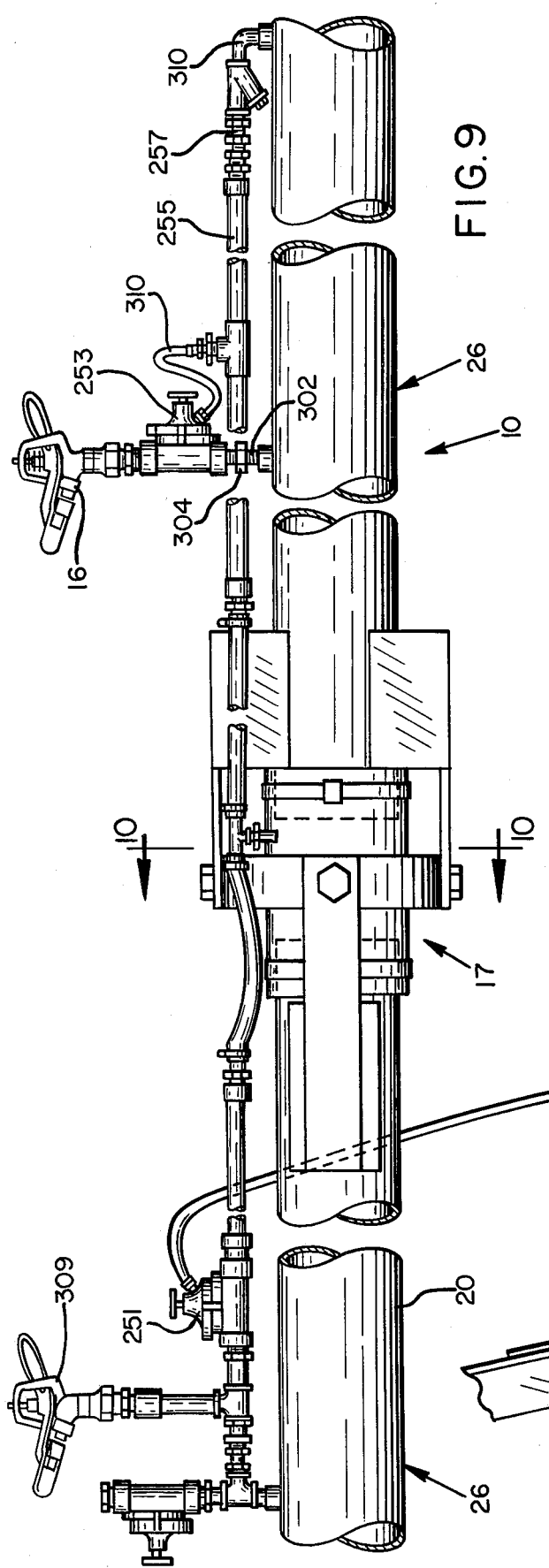
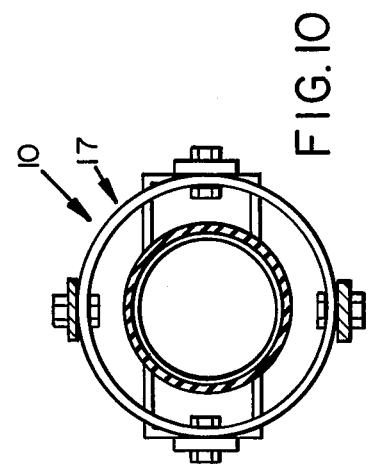
FIG.9
FIG.10

4,223,839

CORNER WATERING CIRCLE MOVE

DESCRIPTION

This invention relates to a corner watering circle move and has for an object thereof the provision of a corner watering circle move.

Another object of the invention is to provide a circle move that supplies water to set sprinklers in corner portions of a square or irregular field to be irrigated.

A further object of the invention is to provide a circle move that stops when it reaches a corner portion of a field being irrigated, pivots an end pipe section relative to the inner pipe sections to move a movable coupling member into engagement with a set coupling member, stops its line sprinklers, supplies set sprinklers through the coupling members with water under pressure, stops the water to the coupling member, starts the line sprinklers and moves to the next corner portion.

In the Drawings:

FIG. 1 is a schematic, top plan view of a corner watering circle move forming one embodiment of the invention and a field in which the move is installed;

FIG. 2 is an enlarged, fragmentary, top plan view of the move and field of FIG. 1;

FIG. 3 is an enlarged, fragmentary, vertical, sectional view taken along line 3—3 of FIG. 2;

FIG. 4 is an enlarged, top plan view of a corner coupling structure of the move of FIG. 1;

FIG. 9 is an enlarged, fragmentary, side elevation view of the line, sprinklers and their supply of the move of FIG. 1; and, FIG. 10 is a vertical, sectional view taken along line 10—10 of FIG. 9.

Figure 5:
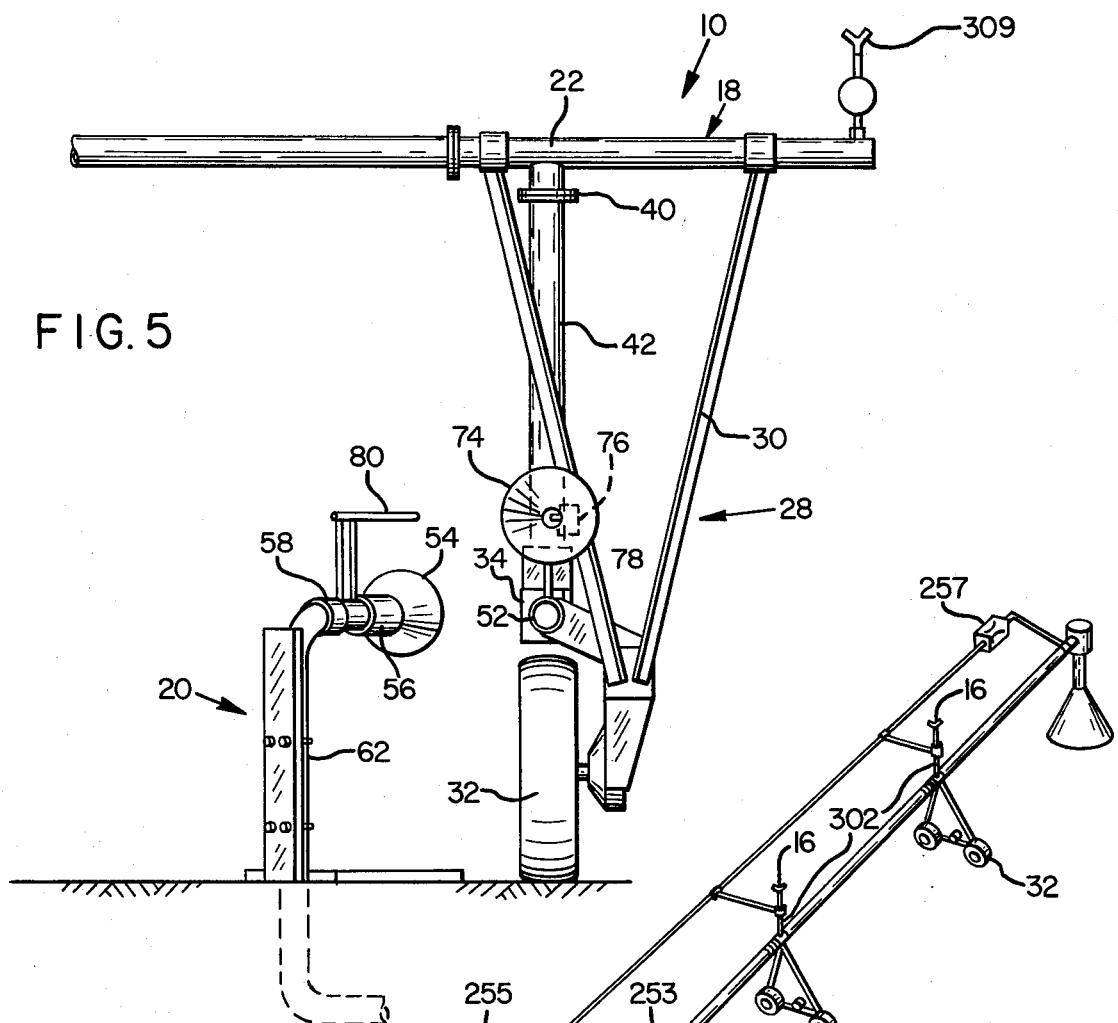
FIG. 5 is an enlarged, vertical, sectional view taken along line 5—5 of FIG. 3.

An improved center pivot irrigation system forming a specific embodiment of the invention includes a pivot line move 10 adapted to move while sprinkling, either in a forward direction (clockwise, as viewed in FIG. 1) or in reverse (counter clockwise, as viewed in FIG. 1). The pivot line move includes an outer pipe section 18 and several, nine, for example, inner pipe sections 26 coupled by known, flexible couplings 17. Assuming movement to be reverse, the line move is adapted to travel on outside of a stationary coupler structure 20 to clear it, automatically stop at each corner portion 12 of a field 14 being irrigated, swing outer end pipe section 18 to the stationary coupler structure 20, couple water supplying pipe section 22 of the line move to the coupler structure, stop line sprinklers 16, supply water from the pipe section 18 to one or more corner sprinklers 24 in fixed positions in the corner portion to sprinkle the corner portion, shut off water to the corner sprinklers 24, start the line sprinklers 16, swing end pipe section 18 back away from the coupler structure into alignment with several inner pipe sections 26 of the move, and the line move moves in its selected direction of movement.

An outer end tower or carriage 28 (the last tower in the specific embodiment disclosed), includes a frame 30 supported by wheels 32 driven by an electric motor 34, shafts 36 and gear boxes 37 and 38. A flanged coupler 40 connects the pipe section 22 to an L-shaped pipe 42 connected to a motorized butterfly valve 44 connected to a pipe 46 connected by a flexible sleeve 48 to a coupler pipe 50 having a tapered end portion 52. The pipe 50, as the carriage is moved to the left (as viewed in FIG. 2), enters a funnel portion 54 of the coupler structure 20 and moves through a chevron-type sealing gasket 55 in a pipe 56 supported by a flexible sleeve 58 connected to an elbow 60 of a pipe 62 connected to the corner sprinkler (or sprinklers) 24.

An aligning cone 74, as the carriage is moved to the left (as viewed in FIG. 2), makes contact with an aligning rod 80, which is fastened to the pipe 56 supported by a flexible sleeve 58. If there is any misalignment between the portion 52 and the funnel portion 54, flexible sleeves 58 and 48 bend until the aligning rod 80 is guided by the taper of the aligning cone 74 through the center. A narrow frame 64 has a foldable track 65, which extends along a chord of the circular path of travel of the carriage 28 and wholly inside that path when the pipe section 18 is substantially aligned with the pipe sections 26, and also includes a post-like upright 66 holding the pipe 62 by U-bolts 68. The upright 66 is rigidly connected to the track 65 on the ground, and braces 72 are connected to the track and the upright to rigidify the upright. As the pipe 50 moves into the pipe 56, the funnel member 74, which carries a limit switch 76 and is mounted rigidly on the coupler pipe 50 by spacers 78, moves over a combined aligning and actuating rod 80 carried by spacers 82 mounted rigidly on the pipe 56. After the pipe 50 has moved into sealing engagement with the gasket 55, the rod 80 actuates the limit switch 76 to deenergize the motor 34. An electric motor 84 of the valve 44 then is actuated to open the valve 44 and the water under pressure in the pipe 22 is supplied to the corner sprinkler 24 to sprinkle the corner area 12. Just before this, valves under the line sprinklers 16 are actuated to shut off the line sprinklers 16.

Figure 6:
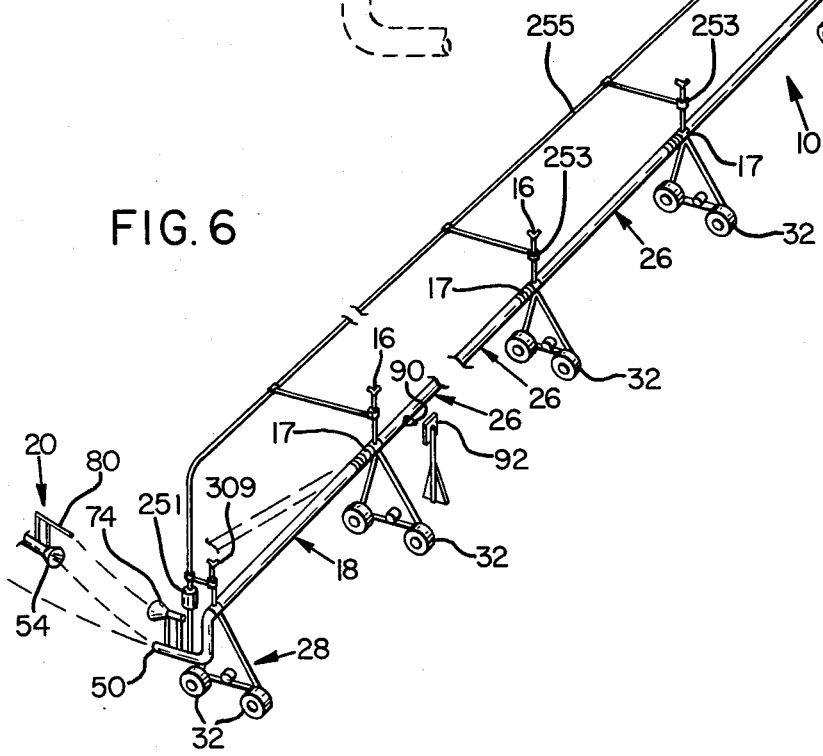
FIG. 6 is a schematic, perspective view of the circle move of FIG. 1.

A photocell switch 90 sends a beam of light, which when the move is at a corner portion 12 (FIG. 6), is reflected by a reflector 92 which is fixed in the field. Thus, the switch 90 is actuated when the move 10 comes to the desired corner-sprinkling location. When the switch 90 is actuated, it stops the line move and starts the corner sprinkling sequence described below. In place of the photocell switch 90, a mechanical limit switch on the line move, may be actuated by a post in the field in the position of the reflector 92.

Figure 7:
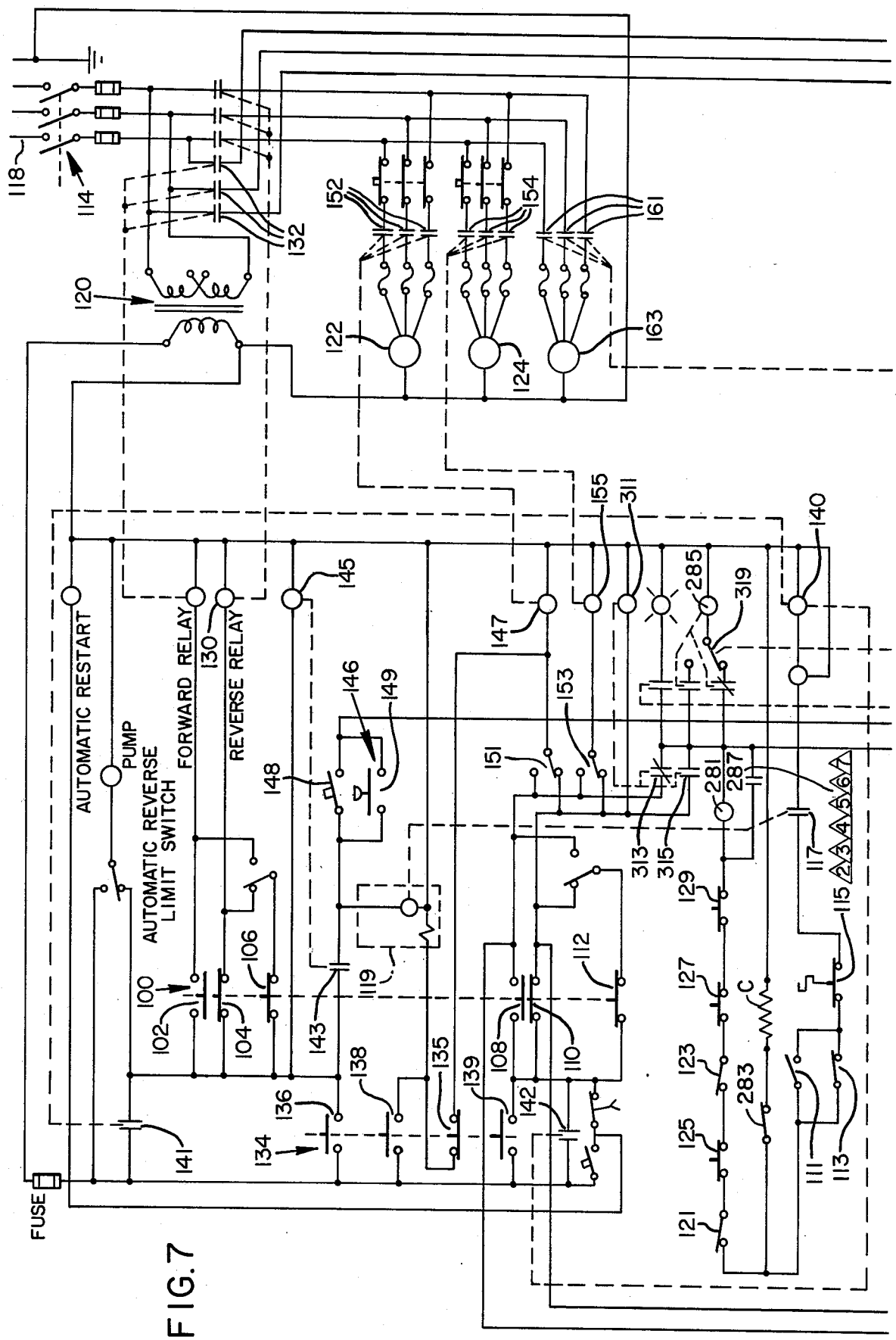
FIGS. 7 and 8 are schematic views of a control circuit of the circle move of FIG. 1.

For the move 10 (FIG. 2) to operate and move in the reverse (counter-clockwise) direction toward one of the corners 12 and sprinkling as it goes, a manual selector switch 100 (FIG. 7) is set in its reverse condition in which contacts 104, 106, 110, and 112 are closed and contacts 102 and 108 are open. Also, a main switch 114 is closed manually to connect a powerline 118 to energize a transformer 120 and make power available to the carriage motor 34 of the tower 28 and motors 122 and 124 of inner and intermediate carriages or towers 17. For simplicity, only the power and controls are shown for the innermost tower and only one intermediate tower. Closing of contacts 104 causes energization of reverse relay winding 130 to close reverse contacts 132 to supply power for running in the reverse direction to the motors 34, 122 and 124. A momentary manual start switch 134 also is closed momentarily at the start to open contacts 135 and close contacts 136, 138 and 139 to energize safety relay 140 to close interlocking contacts 141 and 142. The setting of a percentage timer 145 is manually adjustable to keep contacts 143 closed for a predetermined portion of a minute depending on the setting of the timer motor (e.g. 10% 20%, 30%, etc.). This determines the number of hours of sprinkling per revolution of the machine (or its speed). End tower starter relay 144 is energized through contacts 143 of the timer 145 and contact 149 of a pressure responsive switch 146 (a momentary manual override switch 148 also being provided) closed responsive to water pressure in the line. The energization of the winding 144 causes closing of contacts 150 to energize the motor 34 to drive the outer end carriage 28 in the reverse (counter-clockwise) direction.

When the motor 34 of the outer end carriage 28 is energized, it starts the carriage 28 moving, causing a deflection of the pipe 18 at the coupling 17 of the next inner carriage. This deflection actuates a cam-closing cam switch 153 at this next carriage to energize winding 155 and pull up starter contacts 154 of motor 124. This carriage starts to move and similarly actuates the next carriage and so on. As the last intermediate carriage 26 is started and moves, it closes limit switch 151 to energize starter relay winding 147 to close contacts 152 to energize the motor 122 of the innermost carriage, the other intermediate carriage drives not being shown for simplicity, and each being energized by the next outermost carriage through limit switches like the cam switch 153. It will be understood that, to run the line move when the momentary switch 134 is not held closed, alignment limit switches 121 and 123 of the intermediate towers or carriages 26 and the innermost tower or carriage 28, respectively, manual tower switches 125, 127 and 129, a manual override switch 11 or an end-of-circle limit switch 113, and a low temperature (near freezing) responsive switch 115, all must be closed for the safety relay 140 to be energized. Also, contacts 117 of an all-tower timer 119 must be closed for the safety relay 140 to be energized. The limit switches 121 and 123 each is closed when sections on opposite sides of each tower are within the desired alignment, as is well known in the art. The limit switch 113 is a cam-operated switch actuated at the end of a full circle of movement. To permit movement of the outer section into its corner watering position, the cam thereof is of a configuration such as to actuate a limit switch 123, for movement of the outermost carriage out of alignment in a clockwise direction, only after movement through an angle of about 15° while, in the other direction, a movement of about 2° will actuate the limit switch.

Figure 8:
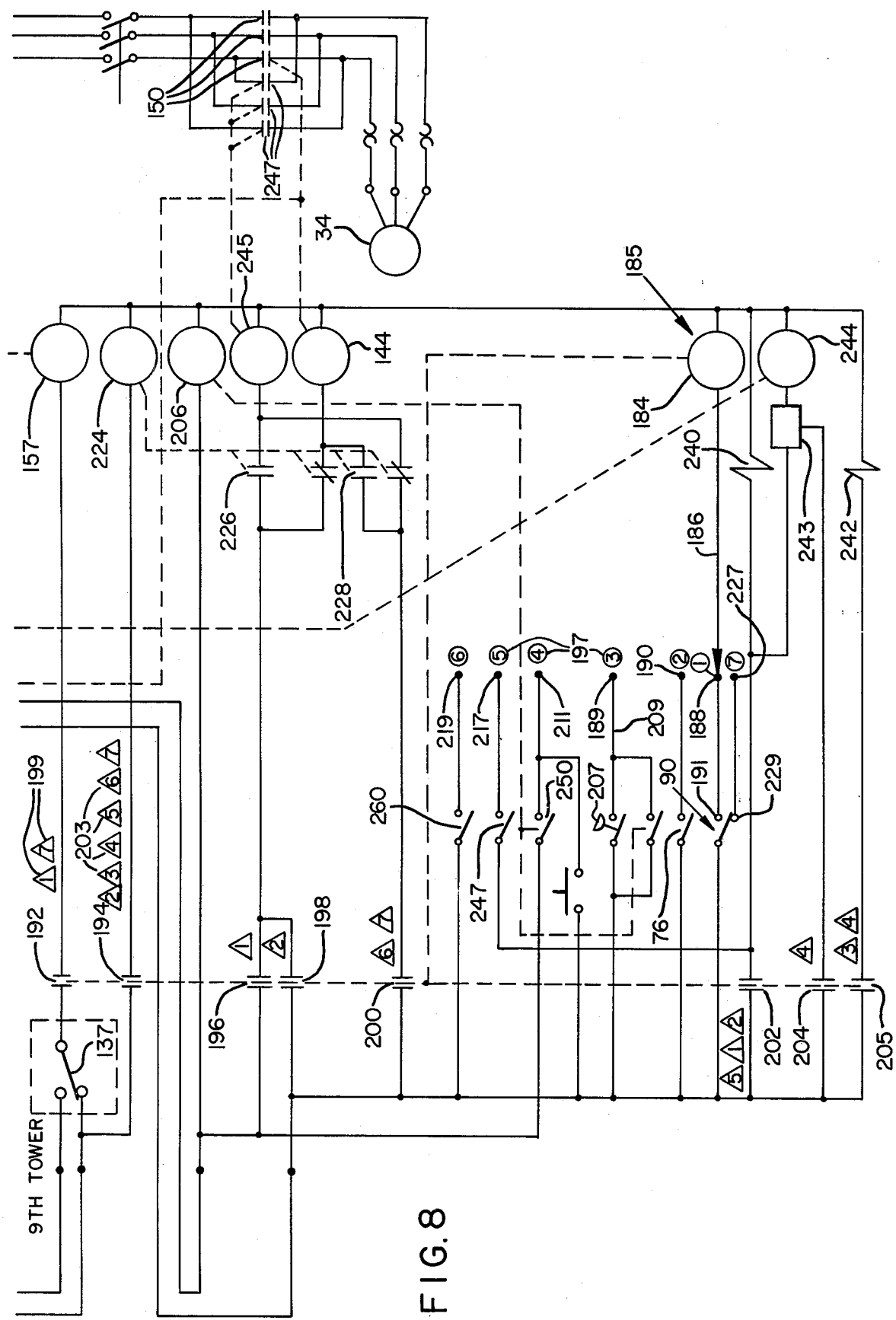

When the move 10 comes to a corner watering position, the photocell switch 90 (FIGS. 6 and 8) are actuated by reflected light from the reflector 92 to close contacts 191. This momentarily energizes stepping relay winding 184 of stepping relay 185 to cause contactor 186 to step from contact 188 to contact 190. The stepping relay is of a well known commercially available type in which the winding 184 steps through seven positions and back to the first. It has cams for each switch contact 192, 194, 196, 198, 200, 202, 204 and 205. The contacts 192 are closed in positions one and seven, and are open in positions two, three, four, five and six, the closed positions being indicated by the triangle contained numbers 199. The contacts 194 are closed in all positions of the stepping switch except position one, the numbers in triangles 203 indicating the positions in which the switch 194 is closed. The contacts 196 are closed only in position one, the contacts 198 are closed only in position two, the contacts 200 are closed only in positions six and seven, the contacts 202 are closed only in positions one, two and five, the contacts 204 are closed only in position four, and the contacts 205 are closed only in positions three and four. The positions of the contactor 186 are shown by the numbers in circles 197. The contacts 194, 198, 200, 204 and 205 are all open when the stepping relay is in position one. In position two, relay winding 245 is energized to close the contacts 247 and the outer end carriage 28 drives forwardly (clockwise) pivoting around the flexible pipe coupling 17 connecting the pipe 22 of the section 18 to the pipe of the adjacent section 24.

When the stepping relay 185 steps to its position two, the contactor 186 moves to contact 190 and then its winding 184 is de-energized since limit switch 76 is still open. In position two (and positions three through six), the contacts 192 are open so that starter relay winding 157 of the ninth tower 17 (next to the outermost tower 28) is de-energized so that contacts 161 of the motor 163 cannot be closed. In positions two through seven, reversing relay winding 224 is energized so that contacts 226 and 228 are open. The carriage 28 continues to drive until the rod 80 actuates the limit switch 76 to close it, which energizes the stepping motor winding 184 to step the relay 185 from position two to position three, the contactor 186 then engaging position three, contact 189.

In position three, the stepping relay 185 opens the contacts 198 to de-energize the relay winding 245, which stops the carriage motor 34. Also, in position three, the contacts 205 are closed to energize solenoid 242 to shut off the sprinklers on the move itself. This causes a pressure switch 207 near the outer end of the move in a control line 209 on the move to close, by increasing the line pressure when flow stops. This actuates stepping switch 185 to step to position four, contactor 186 then engaging position four contact 211 and close contacts 204. Closing of the contacts 204 actuates a control 243 to energize winding 244 of the valve motor 84 to open the valve 44 to supply water to the corner sprinklers 24.

In positions three and four, the solenoid 242 is energized, it places pressure on the diaphragm of a hydraulic valve 251 (FIGS. 6 and 9) mounted at the ninth tower to close the valve 251. This control valve 251, when closed, pressurizes a small water line 255 that is pressurizing the diaphragms of differential pressure valves 253, one under each sprinkler 16 on the line. This closes each valve 253. The line 255 is connected at the pivot end of the line move to the pipe sections 26 by a flow controlling orifice or reducing valve 257. During corner watering, sprinklers 16, which are carried by and supplied with water under pressure by risers 302 carried by couplings 304 connected to the pipe sections, are shut off by the individual differential pressure responsive valves 253 in the risers. The valves 253 are closed when there is a substantial difference in pressure between the pilot line 255 supplying water to end sprinkler 309 and the mainline or pipe sections 26 and are open when there is a substantially lesser difference in that pressure. The pilot line is connected by hoses 310 to the valves 253, is carried by the pipe sections and has a diameter a small fraction of that of the pipe sections. For example, the pilot line may be a one-inch pipe, and the pipe sections be eight inches in diameter. The pilot line is supplied with water from the mainline to its source through the pressure reducing valve 257 set to permit a predetermined flow at a predetermined supply pressure and the outer end sprinkler 16 is set to use the same amount of water at about half that pressure. Very satisfactory results are obtained when the reducer valve 257 is set to permit a flow of four gallons per minute of water at eighty pounds per square inch and the outermost sprinkler 16 on the end pipe section 20 is set to discharge four gallons of water at forty pounds per square inch. This causes a large drop in pressure through the valve 257. However when corner sprinkling is to start and throughout the corner sprinkling, the valve 251 in the line 255 is closed which causes the pressure in the line 255 to raise to about the same as that in the mainline and the valves 253 all close. When the corner sprinkling is completed the valve 251 is opened and the pressure in the line 255 drops to open the valves 253.

The timer 206 is controlled by the percentage timer 145 at the pivot. The reason is so that if the timer 145 at the pivot is adjusted, the time the corner is irrigated will be adjusted so that the application will match the rest of the irrigated area. When the timer 206 times out, it closes contacts 250 to again energize the stepping relay winding 184 to step the relay 185 from position four to position five, the contactor 186 then engaging contact 217. In so doing, the contacts 202 are closed to energize timer clutch winding 240 to reset the timer 206 and to reverse motor winding 244 to close the valve 44.

The motor winding 244 closes the valve 44 to the corner sprinklers and in doing so closes a limit switch 247 to step the relay 185 from position five to position six, the contactor 186 moving from contact 217 to position six contact 219. Also, the contacts 200 are closed to energize reverse relay winding 144 to close reverse contacts 150 to the motor 34 to drive the carriage 28 back away from the coupler structure 20 and the section 18 back into alignment with the sections 26 of the move 10. When the section 18 comes back into alignment with the sections 26, the cam actuator (not shown) on the section 18 at the pivot connection 17 at the ninth tower closes a limit switch 260 on the adjacent section 26 to again energize stepping relay 184 to step the contactor 186 to position seven in which the contactor 186 engages position seven contact 227, closing contacts 191 until the photocell switch 90 is away from the reflector, at which time contacts 229 of the photocell switch 90 are closed. Closing of the contacts 229 steps the relay 185 to position one. The contacts 191 are open at this time so that the stepping relay is not actuated until the next reflector at the next corner portion is reached. The contacts 192 are closed in positions seven and one so that the ninth tower control limit switch 137 is again in the circuit to relay 157, which allows the switch 90 to move away from reflector 92. End tower relay winding 311 controls contacts 313 and 315. Relay 281 is pulled up by the current draw of Resistor C when limit switch 283 is closed. When limit switch 283 is open relay 281 is released. This closes end gun valve motor 285. If contact 287 is closed when relay 281 is pulled up, relay 281 drops out and closes the valve motor. Contact 287 is closed in steps two through seven.

When the move is to be run in the forward (clockwise) direction, switch 100 is set manually to close contacts 102 and 108, and open contacts 104, 106, 110 and 112, and the operation is the same as in the reverse direction except that, for corner watering, the section 18 moves the sprinkler coupler 20 to the reflector 92, is stopped, the section 18 is driven on forward (clockwise) to the coupler, the corner sprinkling is effected, the section 18 is driven back reverse (counter-clockwise) into alignment, and the line again is driven in the forward direction and its sprinkling is resumed.

Whenever the tenth section 18 is aligned with the sections 26, the tenth tower is outside the stationary coupler structure 20 to clear it and the pipe section 18 is high enough to clear the structure 20. Similarly, the ninth pipe section is high enough to clear the reflectors 90, which are inside the path of the ninth tower or carriage 126. The all-tower timer 119 is provided to shut down the entire line if the tenth tower 28 bogs down and merely spins its wheels for too long a time.

The move can be used to irrigate a field or a half square as well as a full square, the line merely being moved back and forth through a semicircle for a half-square field rather than in a full circle for a full square. The well known end "gun" or sprinklers can be used on the line to cover small areas not covered by the stationary sprinklers 24, if it is desired to minimize the number of sprinklers 24 in each corner.

What is claimed is:

1. In an irrigation move,
a contractible line move including a plurality of pipe sections and a plurality of carriages carrying the pipe sections at a predetermined height above ground, and adapted to swing about a predetermined pivot so that the outer end of the line move normally is moved along a predetermined circle when the line move is fully extended,
a set coupling member positioned inside said circle at a height such that the line can pass thereover when the line is fully extended,
a movable coupling member carried by the line move at the outer end thereof at the height of the set coupling member,
means for contracting the line to bring the movable coupling member into alignment with the set coupling member so that the movable coupling member is movable into coupled relationship with the set coupling member,
and set sprinklers connected to the set coupling member.

2. The move of claim 1 including control means for contracting the line move as the line approaches the set coupling member.

3. The move of claim 2 wherein the line move includes a plurality of inner sections and an outer section pivotal relative to the next inner section to contract the line,
the contacting means including means for stopping movement of the line move at a point in which the outer section is near the set coupling member and means for swinging the outer section relative to the rest of the line move to contract the line move and bring the outer section to the set coupling member.

4. In an irrigated move,
a set coupling member having a tapered entrance portion,
a laterally movable line, movable in a predetermined direction,
said set coupling member extending substantially opposite to said direction,
a movable coupling member carried by the line and in a position extending in said direction adapted to be moved endwise into the set coupling member,
the line including carriage means for moving the movable coupling member into the set coupling member, a guide carried by one of the coupling members and extending in said direction, an actuator rod on the other coupling member and extending opposite to said direction and adapted to enter the guide, and control means on the guide and adapted to be actuated by the rod.

5. The move of claim 4 including water supply means turned on when the control means is actuated by the rod.

6. In an irrigation move, a set coupling member having a tapered entrance portion, a movable line, a movable coupling member carried by the line and adapted to be moved endwise into the set coupling member, carriage means for moving the movable coupling member into the set coupling member, a guide carried by the movable coupling member, an actuator rod on the set coupling member and adapted to enter the guide, and control means on the guide and adapted to be actuated by the rod.

7. In an irrigation move, a set coupling member having a tapered entrance portion, a movable line, a movable coupling member carried by the line and adapted to be moved endwise into the set coupling member, carriage means for moving the movable coupling member into the set coupling member, a guide carried by one of the coupling members, an actuator rod on the other coupling member and adapted to enter the guide, control means on the guide and adapted to be actuated by the rod, water supply means turned on when the control means is actuated by the rod, and set sprinkler means supplied by the set coupling member.

8. In a corner water circle move, a set coupling member having a funnel-like entrance portion, a movable coupling member adapted to be moved endwise into the set coupling member, carriage means for moving the movable coupling member into the set coupling member, a funnel-like guide carried with the movable coupling member, an actuator rod on the set coupling member adapted to have the guide moved thereover, and switch means in the guide and adapted to be actuated by the rod.

9. In a circle move irrigation system, an irrigation pipe including a plurality of pipe sections coupled together in which an outer end pipe section is pivotally connected to the other sections, a plurality of power-driven inner carriages for moving the other sections about a center pivot, a power-driven outer end carriage for moving the outer end pipe section, means for supplying water under pressure to the pipe at the center pivot, set corner sprinkler means, pipe means connected to the corner sprinkling means and having a coupler portion, coupling means on the outer end pipe section for coupling to the pipe means, and means for driving the outer end carriage and the inner carriages to selectively place them in a first condition in which the coupling means is driven into coupled relationship to the coupling portion and a second condition in which the coupling means clears the coupling portion.

10. The system of claim 9 wherein the coupling portion of the pipe means is spaced inwardly from the circumference of the circle defined by the coupling means when the outer end pipe section is aligned with the other sections, the outer pipe section being pivotable relative to the other pipe sections to swing the coupling means inwardly and into coupled relationship with the coupling portion.

11. In a circle move irrigation system, a flexible center pivot line movable around a center pivot in a field having corner portions and having primary sprinkler means for sprinkling the circle traversed by the line, a plurality of set sprinklers outside the circle and adapted to sprinkle the corner portions when supplied with water under pressure, a plurality of set coupling members one at each corner portion and pointed in one direction and in a position crosswise to the circle and connected to the set sprinklers, a movable coupling member carried by the line at its outer end and pointed in the direction opposite to said one direction for coupling with each of the set coupling members, the line when straight serving to hold the movable coupling member in a position clearing the set coupling members and when flexed serving to move the movable coupling member into coupled engagement with one of the set coupling members as the line traverses one of the corner portions, line supply means for supplying water under pressure to the line, means for driving the line, means for stopping the line driving means when the movable coupling member couples with one of the set coupling members, means for stopping the primary sprinklers when the movable coupling member is coupled to one of the set coupling members and opening the line supply means to the set coupling member, means for closing the line to the set coupling member after sprinkling period of a predetermined period of time, means connecting the line to the primary sprinklers, means for moving the line rearwardly to move the movable coupling member out of coupled relationship to one of the set coupling members to which it was coupled and to straighten the line, and means for moving the straightened line forwardly past the last mentioned set coupling member.

* * * * *